United States Patent
Ji et al.

(10) Patent No.: US 8,042,183 B2
(45) Date of Patent: Oct. 18, 2011

(54) METHOD AND APPARATUS FOR DETECTING COMPUTER-RELATED ATTACKS

(75) Inventors: Lusheng Ji, Randolph, NJ (US); Dan Pei, Chatham, NJ (US); Jia Wang, Randolph, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1121 days.

(21) Appl. No.: 11/879,529

(22) Filed: Jul. 18, 2007

(65) Prior Publication Data

US 2009/0025082 A1   Jan. 22, 2009

(51) Int. Cl.
*G06F 21/00* (2006.01)
*H04L 29/06* (2006.01)

(52) U.S. Cl. ......................................................... 726/23
(58) Field of Classification Search .................... 726/23
See application file for complete search history.

(56) References Cited

U.S. PATENT DOCUMENTS

| 6,237,037 B1* | 5/2001 | Larsson .................... 709/229 |
| 2002/0078202 A1* | 6/2002 | Ando et al. ............... 709/225 |
| 2004/0181571 A1 | 9/2004 | Atkinson et al. |

OTHER PUBLICATIONS

Butler, K. et al., "Optimizing BGP Security by Exploiting Path Stability", 13th ACM Conference on Computer and Communications Security (CCS'06), pp. 298-310, 2006.
Lad, M. et al., "PHAS: A Prefix Hijack Alert System", 15th USENIX Security Symposium (USENIX Security 2006), 2006.

* cited by examiner

*Primary Examiner* — Gilberto Barron, Jr.
*Assistant Examiner* — Cordelia Zecher

(57) ABSTRACT

Disclosed is a method and apparatus for detecting prefix hijacking attacks. A source node is separated from a destination network at a first time via an original path. The destination network is associated with a prefix. At a second time, a packet is transmitted from the source node to the destination network to determine a current path between the source node and the destination network. A packet is also transmitted from the source node to a reference node to determine a reference node path. The reference node is located along the original path and is associated with a prefix different than the prefix associated with the destination network. The current path and the reference node path are then compared, and a prefix hijacking attack is detected when the reference node path is not a sub-path of the current path.

38 Claims, 4 Drawing Sheets

METHOD AND APPARATUS FOR DETECTING COMPUTER-RELATED ATTACKS

BACKGROUND OF THE INVENTION

The present invention relates generally to networking, and more particularly to detecting computer-related attacks.

Each computer on the Internet can be identified by its Internet Protocol (IP) network address or addresses. FIG. 1 shows a block diagram of a network address 100. Network address 100 includes two parts—a prefix 104 and a host number 108. The prefix 104 uniquely identifies a network which is recognizable and routable by Internet routers. The host number 108 uniquely identifies a communication end point on the network that is specified by the prefix 104. Because the IP network address identifies a communication end point, which is often referred to as a Network Interface (NI), a device may have multiple NIs and therefore multiple IP addresses.

Data communication on the Internet is conducted in units called IP packets. Each IP packet contains the IP address of its source, where the packet is generated, the IP address of its destination, where the packet is intended to be received, and other information such as Time-To-Live (TTL), which specifies how many times this IP packet can be forwarded. On each router there is a routing table which directs how a received packet should be forwarded based on the prefix of the packet's destination address.

Traditionally, authorities allocate prefixes, hence the block of IP addresses represented by the prefixes, to Internet Service Providers (ISPs). When an ISP obtains a prefix, the ISP (i.e., its routers) "announces" or advertises the prefix to other routers on the Internet, and in doing so, own responsibility for exchanging routes with the neighboring routers so that the ISP can gain connectivity to the rest of the Internet.

From a routing point of view, the Internet can be considered to be partitioned into a number of independently administrated entities called autonomous systems (ASes). An AS is a collection of networks (i.e., the routers joining those networks) under the same administrative authority and that share a common routing strategy. Today's Internet includes over 20,000 inter-connected ASes controlled by different administrative domains such as ISPs, corporations, universities, and research institutions.

Different ASes interact with each other in a complex manner through the use of a Border Gateway Protocol (BGP), which is a protocol for exchanging routing information between nodes (e.g., routers). Each AS may own one or multiple prefixes, and hence the networks that the prefixes identify. BGP enables each individual administrative domain to specify its own internal routing policies. Inside each AS, local routing policy decides how to forward packets among its networks. Overall, IP data packets are routed in a hierarchical fashion. First, the packet is forwarded from a source node to a first hop router by local area network forwarding policy. Then the packet enters the ISP AS to be forwarded by the ISP's local routing policy to reach an exterior router of the ISP AS. The exterior router then uses BGP route information to identify which AS is the next AS along the direction towards the packet destination and forwards the packet to this next AS, which again forwards using its local routing policy. These forwardings are based on the prefix of the packet's destination address. Once the packet reaches its destination network, the network uses the host number of the packet's destination address to locate where the packet should be delivered using a local area network mechanism such as Ethernet forwarding.

The BGP routing protocol, however, has no mechanism for authenticating routing announcements. Thus, routers can arbitrarily announce or advertise routes for prefixes and/or fabricate AS paths associated with the prefixes. These false announcements reroute packets destined for a destination network. Such false announcements can be quickly spread to a large number of BGP routers across multiple ASes and affect their routing tables.

This rerouting of packets is known as a prefix hijacking attack and is performed by a hijacker or attacker. The detour of the hijacked traffic passes through sites under the attacker's control. A purpose of prefix hijacking attacks is to intercept data traffic destined for the destination network so the attacker can conduct a number of operations, such as retaining a copy of the communication, conducting man-in-the-middle attacks, or impersonating the destination network. Destination networks may also suffer from degraded network performance and endangered information security. Hijacked prefixes can also be used to spread viruses.

There have been several proposed solutions for detecting prefix hijacking attacks. Some of these proposed solutions use control plane data (i.e., data contained within BGP routing messages sent between routers) to discover routes that are inconsistent with routing principles (i.e., shortest path) and configurations. Control plane data, however, does not always follow general routing principles and, unfortunately, erroneous routing configurations (i.e., route anomalies) are not uncommon.

As a result, these proposed control plane data solutions tend to generate false alarms from route anomalies caused by network operators instead of hijackers. Additional analysis and filtering are needed to handle these false positives. Correcting false positives is generally a difficult task, as it often requires detailed configuration information that network operators may be unwilling to share with others. Also, monitoring control plane data is typically difficult because of the large size of the Internet. Thus, the proposed control plane data solutions are often slow to implement and, as a result, do not react quickly to a problem. Additionally, these proposed control plane data solutions are typically only available among ISPs.

Therefore, there remains a need to more accurately identify prefix hijacking attacks compared with route anomalies produced by network operators.

BRIEF SUMMARY OF THE INVENTION

In accordance with an embodiment of the present invention, an end to end path between a source node and a destination network associated with an IP address prefix is determined. A reference node path between the same source node and a reference node of the destination network is also determined. The reference node is topologically close to the destination network along the path from the source node to the destination network and is associated with a prefix different than the prefix associated with the destination network.

The end-to-end path and the reference node path are then compared, and a prefix hijacking attack is detected when the reference node path is not a sub-path of the end-to-end path. When a prefix hijacking attack is detected, an alarm may be generated to alert a user of the attack.

In one embodiment, a packet is transmitted from the source node to the destination network to detect the end to end path between the source node and the destination network.

In one embodiment, the end to end path, and the reference node path are hop-by-hop paths which list the IP addresses of nodes along the paths. In one embodiment, the IP addresses are converted to AS paths. An AS path only lists the AS numbers of the ASes that a path passes through. Thus, all IP addresses in a hop by hop path belonging to the same AS will be aggregated into the AS number.

In an advantageous embodiment, the reference node is the last hop on the end to end path before entering the destination network.

These and other advantages of the invention will be apparent to those of ordinary skill in the art by reference to the following detailed description and the accompanying drawings.

DETAILED DESCRIPTION

One way to detect prefix hijacking is to catch the hijacking as it is occurring (i.e., to detect abnormal route changes). The problem with this solution, however, occurs when the path taken by packets transmitted from a source node to a destination network changes (with respect to its previous path) because then it is typically very difficult to determine if the path change is the result of a prefix hijacking attack or a route change originated by a network operator or equipment status change (i.e., link failure) (also referred to herein as a legitimate route (or path) change). In accordance with an embodiment of the present invention, hijacking resulted path changes can be separated from legitimate path changes and hence prefix hijacking can be detected.

Figure 1:
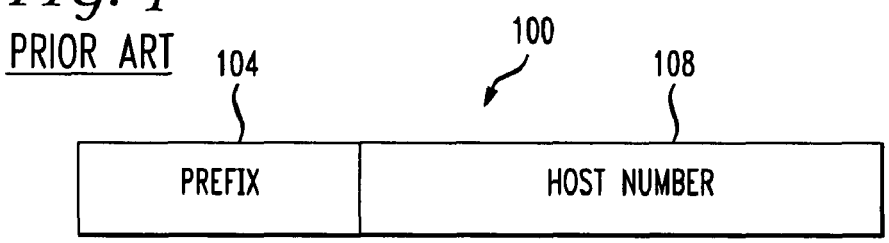
FIG. 1 is a block diagram of a prior art network address.
Figure 2A:
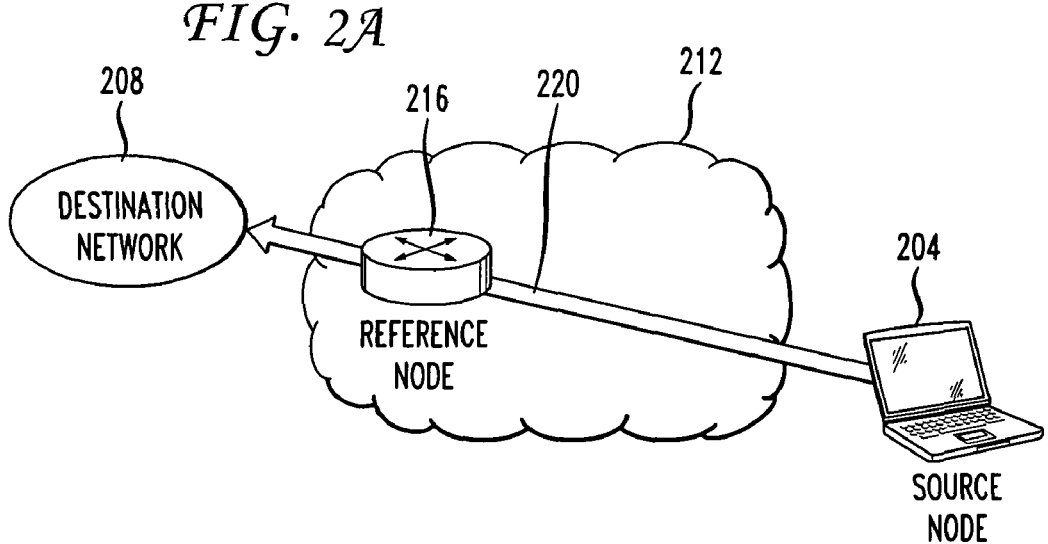
FIG. 2A is a block diagram of a source node transmitting packets along an original path to a destination network in accordance with an embodiment of the present invention.

FIG. 2A is a block diagram of a source node 204 transmitting packets along an original end to end path 220 to a destination network 208 over network 212 (e.g., the Internet). The source node 204 may be a computer, a switch, a router, etc. The original end to end path 220 is defined as the path from the source node to the destination network at a first time. In accordance with an embodiment of the present invention, a reference node 216 is identified. The reference node 216 is located along the original end to end path 220. The reference node 216 is also topologically close to the destination network 208 but has a prefix that is different than the prefix of the destination network 208. A first node is topologically close to a second node when the first node is less than a threshold number of hops away from the second node. Thus, a first node may be a far distance away from (e.g., five hundred miles away from) a second node but can still be topologically close to the second node. For example, the reference node 216 may be the last hop along the original end to end path 220 before an edge router associated with the destination network 208.

Although described herein as one reference node 216, in another embodiment a plurality of reference nodes are identified and used to detect prefix hijacking attacks if the destination network is multi-homed. That is, if the destination network has multiple entry/exit points connecting to multiple ISPs, for each source node, one reference node is identified for each entry/exit point of the destination network.

In one embodiment, the source node 204 determines the original end to end path 220 using traceroute. Traceroute is a well known utility that discovers a path from a source node (e.g., a user's computer) to a destination node. Traceroute shows over how many hops a packet needs to reach the destination node and the IP address of each hop. Each IP packet contains a field called a time-to-live (TTL) field. Every time an IP packet is forwarded, its TTL value is decreased by 1. If a packet's TTL value reaches 0 before the packet reaches its destination, the packet is dropped and the node which drops the packet sends an error message back to the packet source reporting that the TTL value is too low for the packet to reach its destination. By sending a series of packets and incrementing the TTL value with each successive packet (starting from TTL=1), traceroute identifies intermediary nodes by the source IP address of the "TTL too low" error message that the node sends back to the source.

After a reference node 216 is identified, the source node 204 determines (e.g., using traceroute) a reference node path from the source node 204 to the reference node 216. When a destination network is not experiencing a prefix hijacking attack, such as the destination network 208 of FIG. 2A, the reference node path is a sub-path of the end to end path 220 (i.e., the end to end path includes the reference node path).

Figure 2B:
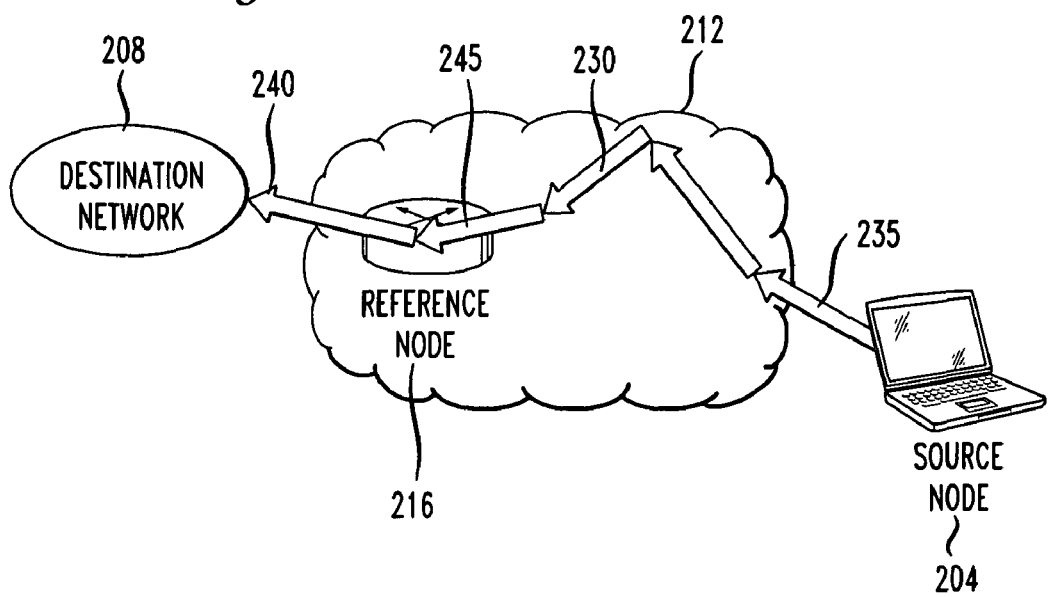
FIG. 2B is a block diagram of the source node of FIG. 2A transmitting packets along a current path to the destination network of FIG. 2A after legitimate route changes in accordance with an embodiment of the present invention.

FIG. 2B is a block diagram of the source node 204 transmitting packets to the destination network 208 over the network 212 after a legitimate route change affects the original end to end path 220 of FIG. 2A. After the legitimate route change occurs, a current end to end path 230 (arrow 235 to arrow 240) is used to transmit the packets from the source node 204 to the destination network 208. A current end to end path is defined as the path from the source node to the destination network at a later time after the first time identified above when the original end to end path is determined. No matter how the current end to end path 230 changes, as long as the reference node 216 is topologically close to the destination network 208, it is extremely likely that the reference node is still on the current end to end path 230 and the reference node path (arrow 235 to arrow 245) from the source node 204 to the reference node 216 is still a sub-path of the current end to end path 230 from the source node 204 to the destination network 208 (arrow 235 to arrow 240). The reason is that the routing strategy of the Internet is mostly based on the actual topology of the Internet. Therefore, from a distant location, because of the topological closeness between the destination network and its reference node, the routes towards the destination network and the reference node are basically identical. This relationship is not affected by legitimate route changes because legitimate route changes typically follow the same strategy, which makes them still associated with the underlying physical topology of the Internet.

The situation is different from hijacking attacks. Hijacked routes are not constructed based on the actual underlying topology of the Internet. Because the reference node 216 has a prefix different than the prefix associated with the destination network 208, however, any prefix hijacking attack targeting the destination network 208 will not include the reference node and therefore will not affect the reference node path. Thus, after a path change, a path disagreement (i.e., a path difference) between a current end to end path from the source node 204 to the destination network 208 and the reference node path between the source node 204 and the reference node 216 indicates a prefix hijacking attack.

Figure 2C:
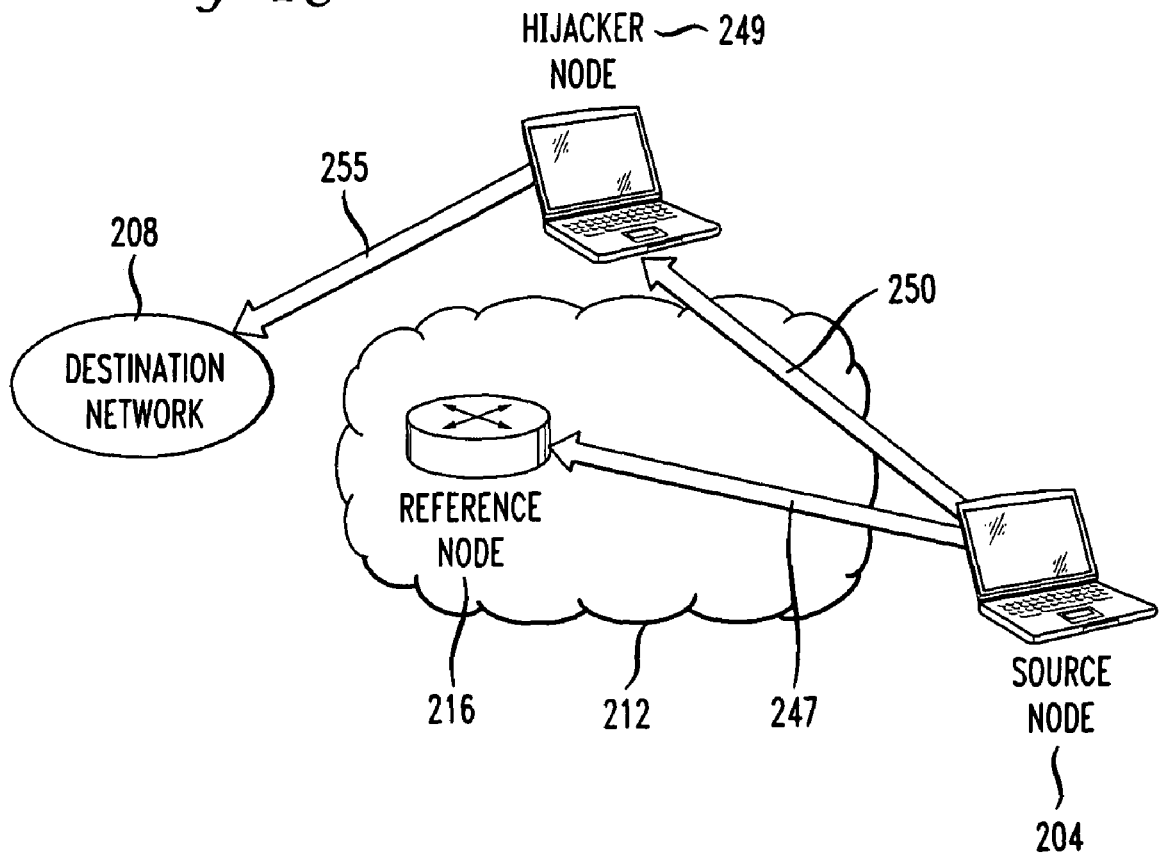
FIG. 2C is a block diagram of the source node of FIG. 2A transmitting packets along a current path to the destination network of FIG. 2A after a prefix hijacking attack has occurred in accordance with an embodiment of the present invention.

FIG. 2C shows the source node 204 of FIGS. 2A and 2B transmitting packets over a current end to end path to the destination network 208 of FIGS. 2A and 2B over network 212 when the destination network's prefix is hijacked. The current reference node path 247 from the source node 204 to the reference node 216 remains the same as the original reference node path shown in FIG. 2A (i.e., a sub-path of the original end to end path 220 of FIG. 2A). The current end to end path to the destination network 208, however, is different than the previously described end to end path (e.g., path 230 of FIG. 2B) because, as a result of a hijacking attack, the end to end path to the destination network 208 now takes a detour through a hijacker node 249 (e.g., a hijacker controlled web site or a hijacker computer). Thus, the current end to end path from the source node 204 to the destination network 208 consists of a first path 250 to the hijacker node 249 and a second path 255 from the hijacker node 249 to the destination network 208.

As a result, current reference node path 247 is not a sub-path of the current end to end path (i.e., first path 250 and second path 255). In accordance with an embodiment of the present invention, this path disagreement indicates a prefix hijacking attack and does not indicate a legitimate route change.

In accordance with an embodiment of the present invention, the role of the source node is a monitor which checks for a particular destination network if the end to end path to the destination network and the reference node path to the reference node of the destination network disagree. Herein the terms "monitor" and "source node" are used interchangeably. In certain embodiments of the present invention, a prefix hijacking monitoring service can be built upon the present invention in which the destination network is the served party and the monitoring service is deployed on a monitor node operated by the prefix hijacking monitoring service provider.

In certain embodiments of the present invention, multiple monitors may be deployed for the same destination network. These monitors may be located in diversified locations. Multiple monitors increase the reliability of the detection because typically prefix hijacking attacks only affect a part of the Internet. If, in a single monitor system, the monitor is located outside of the affected region, it will not detect the hijacking. Deploying multiple monitors in different regions resolves this problem.

It should be noted that, in the multiple monitor embodiment, one reference node should be selected for each monitor (because the reference node for one monitor may not be on the end to end path from another monitor to the same destination network). Also, the farther away a monitor is from the destination network, the more likely network topology changes affect both the end to end path to the destination network and the reference node path to the reference node of the destination network equally.

The detection technique also works with multi-homed destination networks. Multi-homed networks are networks having multiple connections to the Internet, or multiple entry/exit points, with each connecting to a different ISP. Having multiple connections reduces the chance of a potentially catastrophic shutdown if one of the connections should fail. Multi-homing often allows the owner of the destination network to perform load-balancing by lowering the number of computers connecting to the Internet through any single connection. With respect to multi-homed destination networks, a legitimate route change may actually "activate" an alternate path via a different edge router without the monitor(s) knowledge. As a result, if this occurs, a monitor may identify such a change as a hijacking attack because now this monitor's end to end path towards the destination network goes through the new entry/exit point but its reference node path still goes towards the reference node near the previous entry/exit point.

In accordance with an embodiment of the present invention, for each multi-homed destination network, each monitor needs to establish multiple reference nodes with one associated with each entry/exit point of the destination network. In the event that the reference node path to the current reference node does not become a sub-path of the current end to end path from the source node to the destination network, and instead of classifying this path change as a prefix hijacking attack (which would have occurred in the single-homed destination network as described above), the current end to end path to the destination network is compared with reference node paths to all reference nodes associated with the destination network. If none of these reference node paths is a sub-path of the current end to end path, a prefix hijacking attack has occurred.

Figure 3:
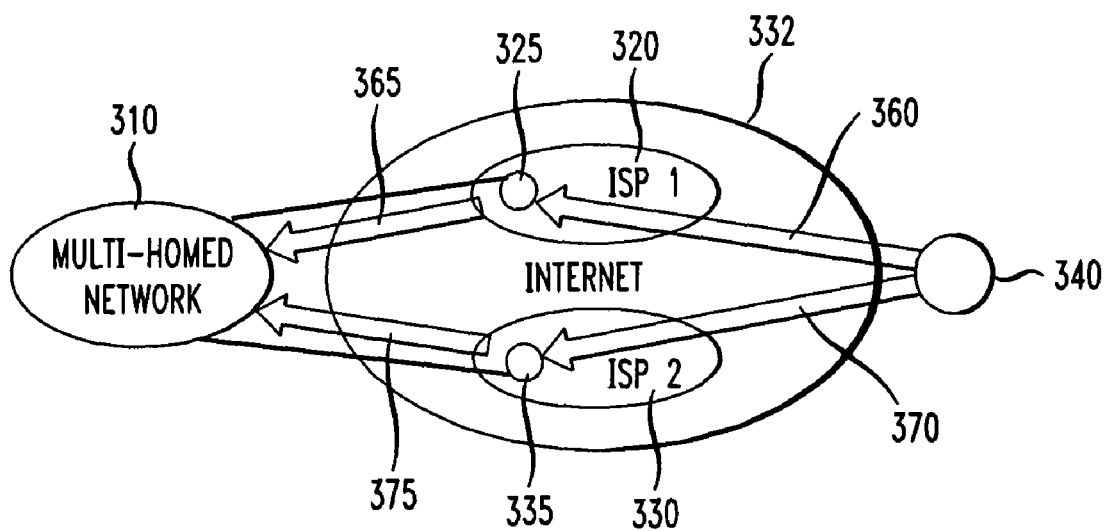
FIG. 3 is a block diagram of a multi-homed destination network in accordance with an embodiment of the present invention.

For a multi-homed destination network, its reference nodes associated with the destination network are established on a per-monitor and a per-entry/exit point basis. FIG. 3 illustrates an embodiment of the present invention being applied to a multi-homed destination network. Destination network 310 is served by two ISPs 320 and 330 of the Internet 332. For a monitor 340, there are two entry/exit points and two reference nodes 325 and 335 are established. Because of the multiple entry/exits points, the paths from the monitor 340 to the destination network 310 are the following: the first end to end path going through the first ISP 320 consists of segments 360 and 365 with its corresponding reference node path being segment 360; and the second end to end path going through the second ISP 330 consists of segments 370 and 375 with its corresponding reference node path being segment 370. Assume that the original path going into the destination network 310 is through the first ISP 320. The reference node path (segment 360) is a sub path of the end to end path (segments 360 and 365). Legitimate routing changes may cause the path going into the destination network 310 to take the second ISP path, and the current end to end path becomes segments 370 and 375. As a result, the original reference path (segment 360) is no longer a sub-path of the current end to end path (segments 370 and 375). However, the reference node path to the reference node 335 in the second ISP 330 is still a sub-path of the current end to end path. Hence this routing change is correctly classified as being caused by a legitimate route change.

In one embodiment, information about a reference node of a specific prefix can be provided by an administrator when the administrator signs up for monitoring service. Typically, this information is available to the administrator because the outgoing router(s) of the destination network are configured using that information. In another embodiment, the source node automatically identifies reference nodes. The source node can probe the destination network (using tools such as traceroute) and can obtain the end to end path from the source node to the destination network's prefix. The source node then traces the discovered end to end path in the reverse direction until reaching the first node (e.g., first router) not in the destination network (i.e., not having the prefix associated with the destination network). The source node may use that first router not in the destination network as a reference node if the router is willing to participate (i.e. if the router is responsive to Internet Control and Management Protocol (ICMP) ECHO_REQUEST). If the most suitable node (e.g., the first router) cannot be used as a reference node, the source node retreats further along the end to end path to a node that is still close to the destination network's prefix but having an address outside of the destination network's prefix.

Figure 4:
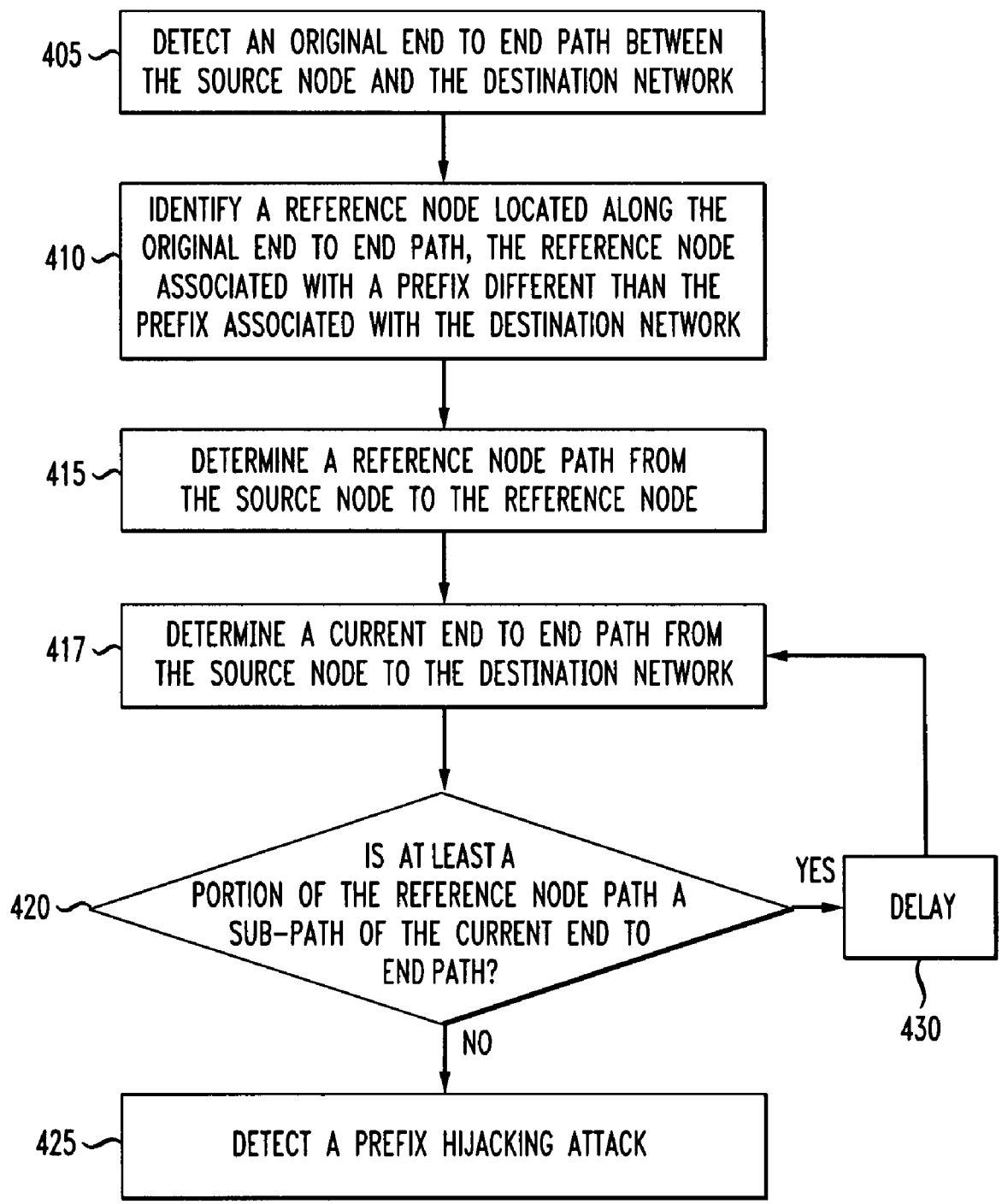
FIG. 4 is a flowchart illustrating the steps performed by the source node to detect a prefix hijacking attack in accordance with an embodiment of the present invention.

FIG. 4 is a flowchart illustrating an embodiment of the steps performed by a source node to detect a computer-related attack such as a prefix hijacking attack. The source node detects an original end to end path between the source node and the destination network in step 405. A reference node is then identified in step 410. The reference node is located along the original end to end path and is associated with a prefix different than the prefix associated with the destination network. A reference node path from the source node to the reference node of the destination network is determined in step 415. A current end to end path from the source node to the destination network is determined in step 417. In step 420, a comparison is made between the reference node path and the current end to end path to determine whether at least a portion of the reference node path is a sub-path of the current end to end path.

In one embodiment, the concept of the aforementioned "path" applies beyond the hop to hop paths and includes AS "paths" and path disagreement is actually disagreement between end to end AS path and reference node AS path. Although hop by hop paths can be discovered using data plane probing mechanisms such as traceroute, hop paths are often not very stable due to minor intra-AS path adjustments (e.g., for the purpose of load balancing). Also, traceroute results may contain null entries, which are caused by intermediate nodes not participating in the network control and management protocols and which make hop by hop path comparison more difficult. AS level paths tend to be more stable because they conceal all intra-AS adjustments. Also, because of the aggregation, AS paths have much less null entries.

In one embodiment, the AS paths are not directly obtainable because real-time measurements are obtained only from the data plane, which typically contain only hop by hop path information. As a result, IP addresses obtained from traceroute are converted into AS numbers. This may be done with the help of a BGP routing table snapshot. It should be noted that although IP-to-AS mapping may not be accurately done, the result is still valid as long as the mapping errors occur equally to both paths in comparison. For example, an unmappable IP address can be marked as "VOID" and two VOID entries can be considered equal.

Returning now to FIG. 4, if at least a portion of the reference node path is not a sub-path of the current end to end path, then a computer-related attack (e.g., a prefix hijacking attack) has been detected in step 425. In one embodiment, an alarm is generated when an attack is detected. If at least a portion of the reference node path is a sub-path of the current end to end path, then the source node delays (step 430) before again determining a current end to end path between the source node and the destination network in step 417. In one embodiment, the source node delays in step 430 and then returns again to step 415 to determine a reference node path and then a current end to end path. In one embodiment, the source node determines the current end to end path (and, in one embodiment, also the reference node path) periodically to determine whether a prefix hijacking attack is taking place.

Figure 5:
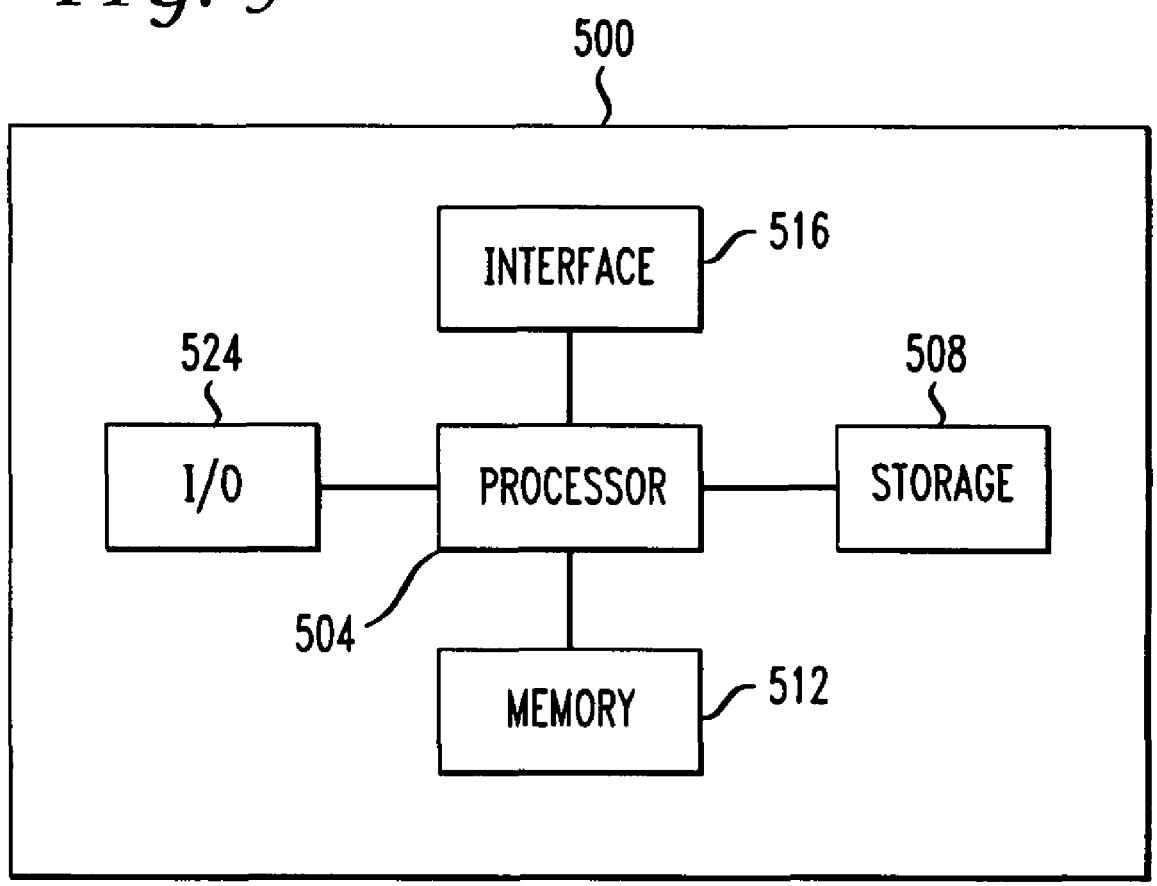
FIG. 5 shows a high level block diagram of a computer system which may be used in an embodiment of the invention.

FIG. 5 shows a high level block diagram of a computer implementation of the source node. Source node 500 contains a processor 504 which controls the overall operation of the computer by executing computer program instructions which define such operation. The computer program instructions may be stored in a storage device 512 (e.g., magnetic disk, database) and loaded into memory 510 when execution of the computer program instructions is desired. Thus, the computer operation will be defined by computer program instructions stored in memory 510 and/or storage 512 and the computer will be controlled by processor 504 executing the computer program instructions. Computer 500 also includes one or more input network interfaces 506 for communicating with other devices via a network (e.g., the Internet). Computer 500 also includes one or more output network interfaces 516 for communicating with other devices. Computer 500 also includes input/output 508 which represents devices which allow for user interaction with the computer 500 (e.g., display, keyboard, mouse, speakers, buttons, etc.). One skilled in the art will recognize that an implementation of an actual computer will contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting a computer-related attack affecting packets transmitted from a source node to a destination network, the source node and the destination network separated by an original end to end path, the destination network being associated with a prefix, the method comprising:
   determining a current end to end path from the source node to the destination network;
   determining a reference node end to end path from the source node to a reference node, the reference node located along the original end to end path and associated with a prefix different than the prefix associated with the destination network;
   converting the current end to end path to a current autonomous system path and converting the reference node end to end path to a reference autonomous system path;
   comparing the current autonomous system path to the reference autonomous system path; and
   detecting a computer-related attack, based on the comparison of the current autonomous system path to the reference autonomous system path.

2. The method of claim 1 further comprising determining the original end to end path from the source node to the destination network.

3. The method of claim 1 further comprising determining the reference node.

4. The method of claim 1 further comprising determining the reference node path.

5. The method of claim 1 further comprising transmitting one or more packets from the source node to the destination network to detect the original end to end path and the current end to end path and from the source node to the reference node to detect the reference node path.

6. The method of claim 1 wherein the current end to end path, the reference node path, and the original end to end path are autonomous system paths.

7. The method of claim 1 wherein the current end to end path, the reference node path, and the original end to end path are hop by hop paths, the hop by hop paths listing addresses of nodes along the paths.

8. The method of claim 5 wherein the transmitting one or more packets from the source node to the destination network further comprises using traceroute to determine Internet Protocol (IP) addresses of nodes.

9. The method of claim 1 further comprising identifying an individual node within the destination network and using a path from the source node to the individual node as at least one of the original end to end path from the source node to the destination network and the current end to end path from the source node to the destination network.

10. The method of claim 1 further comprising identifying a plurality of individual nodes within the destination network and using a path from the source node to any individual node in the plurality of individual nodes as at least one of the original end to end path from the source node to the destination network and the current end to end path from the source node to the destination network.

11. The method of claim 5 wherein the transmitting one or more packets from the source node to the reference node to determine a current reference node path further comprises using traceroute to determine Internet Protocol (IP) addresses of nodes along the reference node path.

12. The method of claim 1 wherein the reference node is a last hop on the Currently Amended end to end path before a hop within the destination network.

13. The method of claim 1 further comprising establishing a plurality of source nodes for the destination network.

14. The method of claim 13 wherein each source node in the plurality of source nodes has its own reference node, its own original end to end path to the destination network, its own current end to end path, and its own reference node path.

15. The method of claim 14 further comprising detecting a computer-related attack when at least a portion of the reference node path of at least one of the plurality of source nodes is not a sub-path of the current end to end path of the at least one of the plurality of source nodes.

16. The method of claim 1 wherein the destination network is a multi-homed destination network having a plurality of entry/exit points.

17. The method of claim 16 wherein each entry/exit point in the plurality of entry/exit points is associated with a reference node in a plurality of reference nodes.

18. The method of claim 17 wherein the determining the reference node path from the source node to the reference node further comprises determining reference node paths from the source node to each of the plurality of reference nodes.

19. The method of claim 18 wherein detecting a computer-related attack further comprises detecting a computer-related attack when at least a portion of the reference node paths are not sub-paths of the current end to end path.

20. The method of claim 1 wherein the determining a current end to end path further comprises periodically determining the current end to end path.

21. A source node separated from a destination network by an original end to end path and configured to detect a computer-related attack affecting packets transmitted from the source node to the destination network, the destination network being associated with a prefix, the source node comprising:

means for determining a current end to end path from the source node to the destination network;

means for determining a reference node end to end path from the source node to a reference node, the reference node located along the original end to end path and associated with a prefix different than the prefix associated with the destination network;

means for converting the current end to end path to a current autonomous system path;

means for converting the reference node end to end path to a reference autonomous system path;

means for comparing the current autonomous system path to the reference autonomous system path; and means for detecting a computer-related attack, based on the comparison of the current autonomous system path to the reference autonomous system path.

22. The source node of claim 21 further comprising means for determining the original end to end path from the source node to the destination network.

23. The source node of claim 21 further comprising means for determining the reference node.

24. The source node of claim 21 further comprising means for determining the reference node path.

25. The source node of claim 21 further comprising means for transmitting one or more packets from the source node to the destination network to detect the original end to end path and the current end to end path and from the source node to the reference node to detect the reference node path.

26. The source node of claim 21 further comprising means for identifying an individual node within the destination network and means for using the path from the source node to the individual node as at least one of the original end to end path from the source node to the destination network and the current end to end path from the source node to the destination network.

27. The source node of claim 21 further comprising means for identifying a plurality of individual nodes within the destination network and means for using the path from the source node to any individual node in the plurality of individual nodes as at least one of the original end to end path from the source node to the destination network and the current end to end path from the source node to the destination network.

28. The source node of claim 21 wherein the reference node is a last hop on the original end to end path before a hop within the destination network.

29. The source node of claim 21 wherein means for detecting a computer-related attack further comprises means for detecting a computer-related attack when at least a portion of a plurality of reference node paths are not sub-paths of the current end to end path.

30. The source node of claim 21 wherein the means for determining a current end to end path further comprises means for periodically determining the current end to end path.

31. A non-transitory computer readable medium comprising computer program instructions which, when executed by a processor, define steps for detecting a computer-related attack affecting packets transmitted from a source node to a destination network, the source node and the destination network being separated by an original end to end path, the destination network being associated with a prefix, the steps comprising:

determining a current end to end path from the source node to the destination network;

determining a reference node end to end path from the source node to a reference node, the reference node located along the original end to end path and associated with a prefix different than the prefix associated with the destination network;

converting the current end to end path to a current autonomous system path and converting the reference node end to end path to a reference autonomous system path;

comparing the current autonomous system path to the reference autonomous system path; and detecting a computer-related attack, based on the comparison of the current autonomous system path to the reference autonomous system path.

32. The computer readable medium of claim 31 further comprising computer program instructions defining the step of determining the original end to end path from the source node to the destination network.

33. The computer readable medium of claim 31 further comprising computer program instructions defining the step of determining the reference node.

34. The computer readable medium of claim 31 further comprising computer program instructions defining the step of determining the reference node path.

35. The computer readable medium of claim 31 further comprising computer program instructions defining the step of transmitting one or more packets from the source node to the destination network to detect the original end to end path and the current end to end path and from the source node to the reference node to detect the reference node path.

36. The computer readable medium of claim 31 further comprising computer program instructions defining the step of identifying an individual node within the destination network and using a path from the source node to the individual node as at least one of the original end to end path from the source node to the destination network and the current end to end path from the source node to the destination network.

37. The computer readable medium of claim 31 further comprising computer program instructions defining the step of identifying a plurality of individual nodes within the destination network and using a path from the source node to any individual node in the plurality of individual nodes as at least one of the original end to end path from the source node to the destination network and the current end to end path from the source node to the destination network.

38. The computer readable medium of claim 31 wherein the reference node is a last hop on the original end to end path before a hop within the destination network.

* * * * *

UNITED STATES PATENT AND TRADEMARK OFFICE
CERTIFICATE OF CORRECTION

| | | |
|---|---|---|
| PATENT NO. | : 8,042,183 B2 | Page 1 of 1 |
| APPLICATION NO. | : 11/879529 | |
| DATED | : October 18, 2011 | |
| INVENTOR(S) | : Lusheng Ji, Dan Pei and Jia Wang | |

It is certified that error appears in the above-identified patent and that said Letters Patent is hereby corrected as shown below:

Col. 9, line 31, Claim 12, "on the Currently Amended end to end path" should read -- on the end to end path --

Signed and Sealed this
Twentieth Day of March, 2012

David J. Kappos
*Director of the United States Patent and Trademark Office*